United States Statutory Invention Registration [19]

[11] Reg. Number: H987

Buchanan et al. [43] Published: Nov. 5, 1991

[54] TEMPERATURE STABLE CERAMIC DIELECTRIC COMPOSITIONS

[76] Inventors: Relva C. Buchanan, 1723 Henry St., Champaign, Ill. 61821; Aléna K. Maurice, 1205 Florida Ave., Apt. 14A, Urbana, Ill. 61801

[21] Appl. No.: 364,416

[22] Filed: Jun. 12, 1989

[51] Int. Cl.[5] ..... C04B 35/49
[52] U.S. Cl. ..... 501/137
[58] Field of Search ..... 501/137, 138, 139

[56] References Cited

U.S. PATENT DOCUMENTS

| | | | |
|---|---|---|---|
| 2,529,719 | 9/1947 | Wentworth | 501/138 |
| 2,708,243 | 5/1955 | Brajer | 310/8 |
| 2,735,024 | 2/1956 | Kulcsar | 310/8.3 |
| 3,666,505 | 5/1972 | Hoffman et al. | 501/139 |
| 3,775,142 | 11/1973 | Roup | 106/3.31 |
| 4,058,404 | 11/1977 | Fujiwara et al. | 106/73.31 |
| 4,244,830 | 1/1981 | Hennings et al. | 106/39.5 |
| 4,335,216 | 6/1982 | Hodgkins | 501/32 |
| 4,353,047 | 10/1982 | Noguchi et al. | 333/247 |
| 4,468,472 | 8/1984 | Kashima et al. | 501/137 |
| 4,535,064 | 8/1985 | Yoneda | 501/138 |

OTHER PUBLICATIONS

N. M. Molokhia and M. A. Issa, Pramána, vol. 11, [3], pp. 289–293.

T. R. Armstrong & R. C. Buchanan, "Influence of $ZrO_2$ on the Microstructure of $BaTiO_3$", Proceedings of the 45th Annual Meeting of the Electron Microscopy Society of America, '87.

*Primary Examiner*—Robert L. Stoll
*Assistant Examiner*—Daniel S. Metzmaier

[57] ABSTRACT

A ceramic dielectric composition useful in the manufacture of compact ceramic capacitors consisting essentially of barium titanate and zirconium dioxide has a dielectric constant ranging from 1800 to 3500 and a heat dissipation factor, tangent delta, less than 3% over the operating temperature range of electronic circuit components.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TEMPERATURE STABLE CERAMIC DIELECTRIC COMPOSITIONS

BACKGROUND OF THE INVENTION

1. Field of Invention

This invention relates to ceramic dielectric insulating materials. More specifically, it relates to a ceramic material having a high dielectric constant with low temperature dependence and low energy loss, for use in the manufacture of compact ceramic capacitors. It further relates to a method of making such a ceramic material.

A high dielectric constant is essential for the manufacture of compact ceramic capacitors. For a given desired capacitance, other properties being equal, the size of a capacitor is inversely proportional to the dielectric constant. A high dielectric constant thus allows a given capacitance to be provided in a small component.

Another property of importance in the manufacture of a capacitor is the temperature dependence of the dielectric constant. The use of a material with a dielectric constant which is relatively constant over a wide temperature range is desirable because a capacitor using such dielectric material can function in an electrical system over a wide operating temperature range without appreciable variation in capacitance.

The Electronic Industry Association has designated stable capacitance characteristics in which the variation of dielectric constant with temperature over a specified temperature range is within certain limits. The designation "Negative Positive Zero" (NPO) refers to dielectric materials with a dielectric constant less than 150 and no more than 1% variation in dielectric constant between −55 and +125 degrees C. The designation Y7R for what are referred to as "stable mid-K" class II dielectrics, stands for a range of dielectric constant from 600 to 4000, with a maximum of +15% variation in dielectric constant between −30 and +125 degrees C.

Another important property in the choice of dielectric materials for ceramic capacitors is the heat dissipation, which is related to electrical conductivity. This property is commonly expressed in terms of "tangent delta", a factor which is directly proportional to the power dissipated as heat due to current flow across the ohmic resistance of the material when an alternating voltage having a frequency of 1 to 90 kHz is applied across the dielectric material. A value of less than 0.03, or 3%, in terms of tangent delta is considered to be satisfactory.

Yet another important factor from the standpoint of capacitor manufacture is the reproducibility of dielectric properties from batch to batch of ceramic material being prepared. This reproducibility relies on the proper control of the crystal size in the ceramic dielectric material during its preparation.

Dense, fine-grained, fired ceramic materials, especially barium titanate-based materials, with high dielectric constants exhibiting low temperature dependence and low heat dissipation have long been sought. However, it has proved difficult to find materials meeting all the above criteria. The admixture of metal oxides and the manner of processing, such as milling, firing temperatures, time or atmosphere under which the material is fired, have been found to affect the homogeneity, grain size, and other properties of the ceramic dielectric material.

Conventional methods of incorporating metal oxides into the base material for grain growth control generally produce materials of uneven, coarse grains. Frequently, such materials exhibit appreciable variations in dielectric constant with temperature and pronounced peaks in dielectric constant at certain temperature within the normal operating temperature range of electronic circuit components.

2. Description of Prior Art

U.S. Pat. No. 4,468,472 discloses ceramic dielectrics containing oxides of Ba, Ce, Zr, a and Ti with the optional oxides of Mn, Fe, Ni, and Co. The oxide mixture on sintering forms crystals below 5 microns in size. The dielectric constant exhibits negative temperature dependence. The dissipation factor is above or equal to 1.0%. U.S. Pat. No. 4,058,404 discloses a sintered ceramic dielectric containing strontium titanate, barium titanate, bismuth oxide, and titanium oxide exhibiting low changes in dielectric constant with temperature and low dissipation loss.

U.S. Pat. No. 3,775,142 discloses an NPO-type of ceramic material having high titanium oxide content (60–65 mol %) with oxides of Ca, Sn and Zr ranging 0–5 mol %. A low dielectric constant in the range of 55–90 was achieved. Canadian Patent 920,348 discloses a ceramic dielectric having a ceramic portion, consisting of oxides of titanium and zirconium and barium titanate; and a glass portion consisting of oxides of cadium, silicon and boron. The dielectric constant is in the range of 55–90.

Molokhia and Issa (Pramana, Vol. 11, No. 3, Sept. 1978, pp. 289–293) attempted to improve the dielectric properties of a barium titanate ceramic by adding zirconia. The dielectric constant of the ceramic showed strong temperature dependence.

SUMMARY OF THE INVENTION

It is the object of this invention to provide a ceramic material superior to the NPO specification in terms of dielectric constant though not meeting the 1% limit on variations of dielectric constant with temperature, and approximating the requirements of the Y7R specification. Accordingly, the object of this invention is to provide a novel ceramic material which exhibits a high dielectric constant of about 1800–3500 which is relatively independent of temperature over the normal operating temperature range of electronic circuit components, and which furthermore has a low heat dissipation factor, for use in the manufacture of compact ceramic capacitors. Another object of this invention to provide a method for producing such ceramic material. The material consists essentially of high-purity barium titanate with a small amount of zirconium dioxide. The aforementioned objectives and advantages of the instant invention will become more clearly apparent from the following detailed description thereof which is to be read with reference to the accompanying figures.

DETAILED DESCRIPTION OF THE INVENTION

Figure 1:
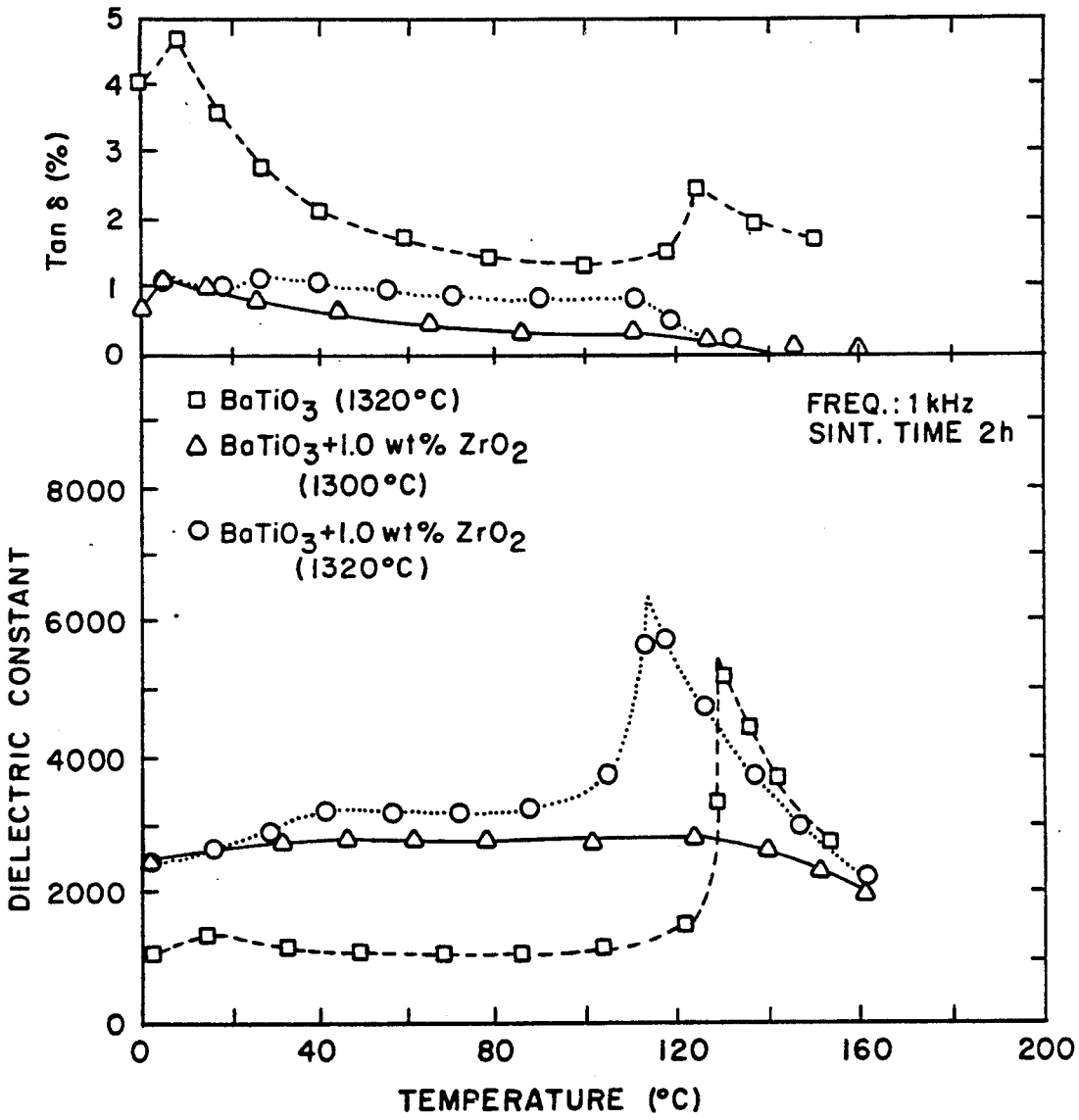
FIG. 1 shows the dielectric constant and the dissipation loss factor, tangent delta, expressed in percent, as a function of temperature for three barium titanate-based ceramics, two containing 1 weight percent of zirconium dioxide and one without zirconium dioxide addition.

The objectives of this invention are achieved by stabilization of dielectric properties through the attainment of a homogeneous, fine-grained, dense microstructure by incorporating zirconium dioxide (zirconia) as a grain growth inhibitor at the barium titanate grain boundaries. Powder of commercial barium titanate of at least 99% purity is desirable to avoid containments which would alter the desirable microstructure of the sintered material. Barium titanate having a Ba/Ti atomic ratio of 0.99–1.01 is desirable; however, an atomic ratio of 0.997–1.002 is preferred. The barium titanate should have a particle size range of 0.7–1.5 microns, a particle size of about 1.0 micron being preferred. The zirconia should have a particle size range of 0.02–0.3 microns, preferably a particle size of about 0.03 micron. These two powders are deagglomerated and mixed in a liquid medium by conventional ball milling.

Zirconia is added in the amount of 0.05 to 2.0 weight percent based on barium titanate. The preferred zirconia content is about 1.0 weight percent.

The liquid medium consists of the following commercially available ingredients:

dispersant: 0.2–3.0 weight percent, preferably about 1 weight percent, of glycerol esters of natural fatty acids, such as fish oil or palm oil, fish oil being preferred; non-oil dispersants such as sodium or ammonium polyphosphates or triethanolamine may alternatively be used;

lubricant: about 0.2–3.0 weight percent, preferably about 1 weight percent, such as butyl stearate, sodium or zinc stearate, oleic acid, ammonium polymethylmethacrylate, or Carbowax 4000 (polyethylene glycol manufactured by Union Carbide); and binder: about 0.2–3.0 weight percent, preferably about 1 weight percent, of polyvinyl alcohol; other binders, such as cellulose, dextrin, polyvinyl acetate, polyvinyl butyrate, or ethyl hydroxymethyl cellulose may also be used;

the remainder of the medium being about 0–80, preferably 60 volume percent of an alcohol having 1–5 carbon atoms per molecule, preferably ethanol, in deionized water.

The ratio of powder to liquid medium may range from 1:5 to 1:25 by weight, 1:10 being preferred.

During the milling process, zirconia particles are intimately mixed with barium titanate particles. The mixing is improved and the required milling time is shortened when zirconium nitrate dissolved in water, or zirconium alkoxides such as zironium butoxide or isopropoxide, which are soluble in alcohol, are used in the mixture. These zirconium compounds form zirconium oxide in the mixture during ball milling. About 2–20 hours of ball milling are required, 12 hours being preferred.

The resulting slurry is then spray-dried and the dried granules are compacted at a pressure from 15,000–30,000 psi, preferably at 25,000 psi to disks, by methods known in the art. Alternatively, the slurry may be cast into tape cast form by dispersing the granules in a mixture of polyvinyl butyrate and methyl ethyl ketone. As this technique is also known in the art, no further details thereof are necessary for the understanding and practicing the present invention.

The compacted discs generally have 40–80%, preferably about 60% of the theoretical density of barium titanate, which is 6.0 gm/cm. The compacted discs are sintered in air at 1275 to 1320 degrees C. for 1–4 hours, preferably for 1–2 hours. The sintering temperature is critical in that it must occur below the temperature at which a solid solution of barium titanate and zirconium oxide forms. This temperature is 1320 degrees C. When a solid solution begins to form, coarse grains of barium titanate of irregular size are formed. This undesirable result is avoided by sintering below the solid solution temperature. Thus, the preferred temperature range for sintering is 1275–1320 degrees C. During the sintering process, zirconia acts as grain growth inhibitor at the grain boundaries between barium titanate particles yielding homogeneous, fine, dense grains of barium titanate having an average size of 0.7 to 1.5 microns, preferably about 1 micron.

The high dielectric constant of the ceramic dielectric material in the range from 2000 to 3500, the low temperature dependence of the dielectric constant and the absence of peaks in dielectric constant at certain temperatures, and a low dissipation factor, tangent delta, below 3%, is attributed to the uniformity of the barium titanate crystal size in the compacted and sintered material prepared in accordance with this invention. The material is far superior to dielectrics of the NPO-type in that its dielectric constant is much higher than the range typical of such dielectrics, 100–150, though it does not meet the very stringent temperature variation standard of the NPO specification, 1% over the broad temperature range from −55 to +125 degrees C. It approximates the requirements of the Y7R standard, which specifies a dielectric constant in the range from 600 to 4000 and a 15% variation in dielectric constant between −30 and +125 degrees C.

The dielectric properties of the ceramics are shown in FIG. 1. The circles and the triangles represent sintered ceramics containing 1.0 weight percent of zirconia, sintered at 1320 and 1300 degrees C, respectively. The squares represent the base material without addition of zirconia, showing a much lower dielectric constant and higher dissipation factor. It is apparent from the graph that the material prepared by the preferred method as illustrated by triangles has the lowest temperature dependence in terms of dielectric constant and the lowest dissipation factor. Tangent delta, which relates to heat dissipation loss, is less than 1% over the temperature range from 25 to 160 degrees C., and the dielectric constant varies between 2000 and 2800. The preferred method of preparation is characterized by a zirconia content of 1% and sintering temperature of 1300 degrees C.

Barium titanate not containing zirconia exhibits a high tangent delta in comparison with the preferred composition of this invention over the entire temperature range. Furthermore, barium titanate without zirconia exhibits low dielectric constant from 0 to 120 degrees C., and a pronounced peak in dielectric constant about 130 degrees C.

Figure 2:
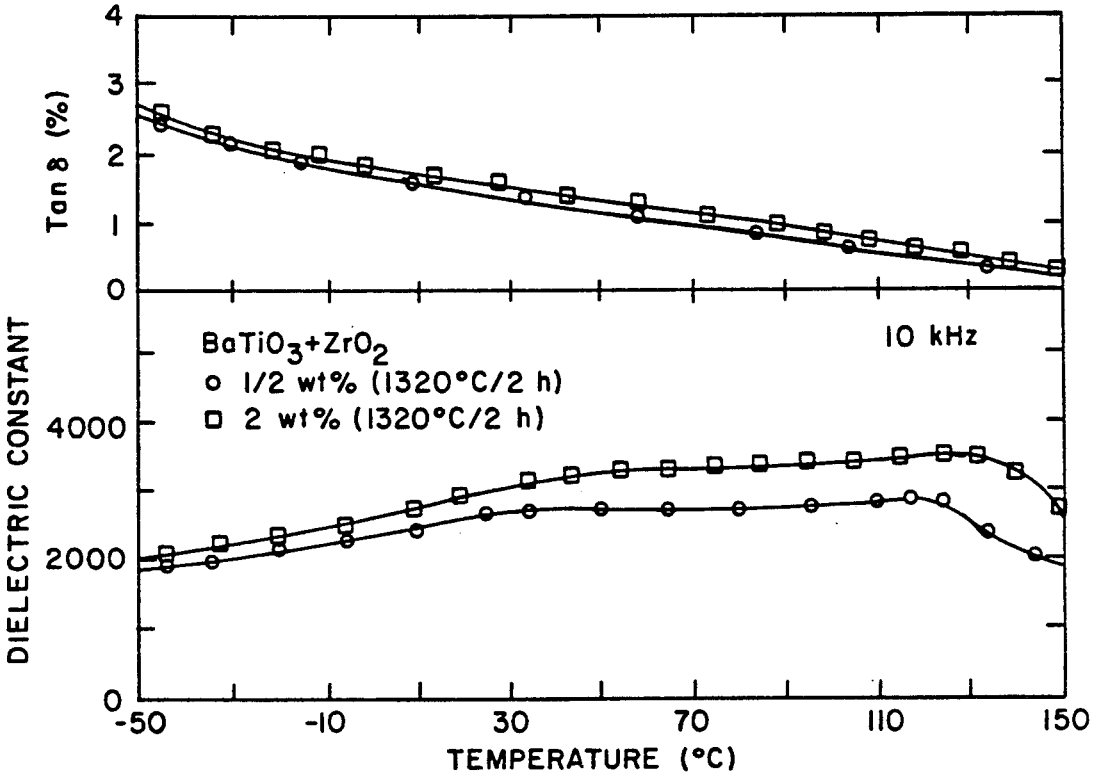
FIG. 2 shows the dielectric constant and the dissipation loss factor, tangent delta, expressed in percent, versus temperature for barium titanate containing 0.5 and 2 weight percent of zirconium dioxide.

FIG. 2 shows the dielectric constants and dissipation factors of two ceramic compositions of this invention containing 0.5 and 2 weight percent of zirconia, as functions of temperature between −50 and +150 degrees C. The dielectric constants range from 1800 to 3500, and the dissipation factors are under 2.7 percent. The sintering temperatures are 1310 and 1320 degrees C., respectively.

Measurements of dielectric constant and dissipation loss were made with an automatic capacitance bridge, Hewlett Packard Model 4276A, Palo Alto, Calif., at 1 kHz and 10 kHz. Microstructural examinations were performed on the fired ceramics using an ISI DS-130 electron microscope. The microstructure of the ceramic material in accordance with the present invention exhibited dense barium titanate crystals of relatively uniform size averaging about 1 micron or less. Zirconium oxide grains are evenly dispersed at the boundaries of the barium titanate grains as a non-liquid second phase.

By using multiple discs of the ceramic material of this invention, one may construct compact high-capacitance capacitors having stable characteristics over a wide temperature range, and low heat dissipation. The ceramic dielectric material according to the present invention thus is suitable for use in microelectronic circuitry with high performance requirements.

This invention has been described in terms of a specific embodiment thereof. It is not to be so limited, and numerous variations and modifications thereof will be apparent to those skilled in the art. It is to be understood that such variations or modification are within the scope of the appended claims, and the invention may be practiced otherwise than as specifically described.

We claim:

1. A ceramic dielectric composition having a dielectric constant in the range from 1800 to 3500 in the temperature range from −50 to +150 degrees C., and having a heat dissipation factor, tangent delta, not exceeding 3 percent in said temperature range, consisting essentially of 98 to 99.5 percent by weight of barium titanate and 0.5 to 2.0 percent by weight of zirconium dioxide.

2. The ceramic dielectric composition of claim 1 wherein the barium titanate is of at least 99 percent by weight purity, and the Ba:Ti atomic ratio is 0.99 to 1.01.

3. The ceramic dielectric composition of claim 1 which is made from barium titanate powder having a particle size range from 0.7 to 1.5 microns, and zirconium dioxide powder having a particle size range from 0.02 to 0.3 microns.

4. A ceramic dielectric composition suitable for use in manufacturing capacitors characterized by a dielectric constant of about 2500 to 3500, and tangent delta less than 1 percent, over a temperature range of 25 to 125 degrees C., consisting essentially of barium titanate and 0.5 to 2.0 weight percent of zirconium oxide.

* * * * *